United States Patent
Kang et al.

(10) Patent No.: US 10,131,118 B2
(45) Date of Patent: Nov. 20, 2018

(54) STRENGTHENED LAMINATED GLASS STRUCTURES

(71) Applicants: Corning Incorporated, Corning, NY (US); Kiat Chyai Kang, Painted Post, NY (US); Sue Camille Lewis, Webster, NY (US); Govindarajan Natarajan, Poughkeepsie, NY (US); Yu Xiao, Pittsford, NY (US); Chunhe Zhang, Horseheads, NY (US)

(72) Inventors: Kiat Chyai Kang, Painted Post, NY (US); Sue Camille Lewis, Webster, NY (US); Govindarajan Natarajan, Poughkeepsie, NY (US); Yu Xiao, Pittsford, NY (US); Chunhe Zhang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 450 days.

(21) Appl. No.: 14/759,354

(22) PCT Filed: Jan. 6, 2014

(86) PCT No.: PCT/US2014/010287
§ 371 (c)(1),
(2) Date: Jul. 6, 2015

(87) PCT Pub. No.: WO2014/107640
PCT Pub. Date: Jul. 10, 2014

(65) Prior Publication Data
US 2015/0336357 A1    Nov. 26, 2015

(51) Int. Cl.
*B32B 17/06*        (2006.01)
*B32B 7/12*         (2006.01)
(Continued)

(52) U.S. Cl.
CPC .............. *B32B 17/061* (2013.01); *B32B 7/02* (2013.01); *B32B 7/10* (2013.01); *B32B 7/12* (2013.01);
(Continued)

(58) Field of Classification Search
CPC ....... B32B 15/18; B32B 15/20; B32B 17/061; B32B 7/12; B32B 7/10; Y10T 428/24942;
(Continued)

(56) References Cited

U.S. PATENT DOCUMENTS 2,392,314 A * 1/1946 Dalton .................... C03C 27/02
428/432
3,338,696 A    8/1967 Dockerty
(Continued)

FOREIGN PATENT DOCUMENTS

CN    102659307 A    9/2012
DE    9204379 U1    7/1992
(Continued)

OTHER PUBLICATIONS

"AISI Type 304 Stainless Steel". ASM Material Data Sheet, pp. 1-2; Retrieved Aug. 24, 2017 (Year: 2017).*
(Continued)

*Primary Examiner* — Prashant J Khatri

(57) ABSTRACT

A laminated glass structure comprising a non-glass substrate and a glass sheet bonded to the non-glass substrate to form the laminated glass structure, wherein the laminated glass structure withstands a ball drop test wherein a 535 g stainless steel ball is dropped from a height of 0.8 m onto the laminated glass structure, with the glass sheet being impacted by the ball. The glass sheet has a thickness such that the glass sheet exhibits, without cracking, deformation to adapt to any shape change of the non-glass substrate as imparted by the ball of the ball drop test.

12 Claims, 8 Drawing Sheets

(51) Int. Cl.
*B32B 7/02* (2006.01)
*B32B 15/18* (2006.01)
*B32B 15/20* (2006.01)
*B32B 7/10* (2006.01)

(52) U.S. Cl.
CPC .............. *B32B 15/18* (2013.01); *B32B 15/20* (2013.01); *B32B 2307/558* (2013.01); *Y10T 428/24942* (2015.01); *Y10T 428/24967* (2015.01); *Y10T 428/26* (2015.01); *Y10T 428/266* (2015.01)

(58) Field of Classification Search
CPC ........... Y10T 428/24967; Y10T 428/26; Y10T 428/266; C03C 27/04–27/10
See application file for complete search history.

(56) References Cited

U.S. PATENT DOCUMENTS

| | | | |
|---|---|---|---|
| 3,682,609 | A | 8/1972 | Dockerty |
| 3,793,401 | A | 2/1974 | Nield et al. |
| 3,798,817 | A | 3/1974 | Zanoni |
| 3,822,122 | A | 7/1974 | Plumat et al. |
| 3,849,097 | A | 11/1974 | Giffen et al. |
| 4,337,997 | A | 7/1982 | Sadoune et al. |
| 4,510,195 | A * | 4/1985 | Iida ............................ B32B 3/10 136/256 |
| 4,985,099 | A | 1/1991 | Mertens et al. |
| 6,270,605 | B1 | 8/2001 | Doerfler |
| 6,287,674 | B1 | 9/2001 | Verlinden et al. |
| 6,833,665 | B2 | 12/2004 | Wachi et al. |
| 6,861,136 | B2 | 3/2005 | Verlinden et al. |
| 8,840,997 | B2 | 9/2014 | Koyoma et al. |
| 8,871,348 | B2 * | 10/2014 | Sawada ............... C03C 17/2456 136/256 |
| 8,889,254 | B2 | 11/2014 | Bayne et al. |
| 8,973,401 | B2 | 3/2015 | Borrelli et al. |
| 2004/0052080 | A1 | 3/2004 | Hieda et al. |
| 2004/0069770 | A1 | 4/2004 | Cary et al. |
| 2006/0134394 | A1 | 6/2006 | Burroughes et al. |
| 2007/0048895 | A1 | 3/2007 | Suginoya et al. |
| 2010/0065116 | A1 * | 3/2010 | Stancel ............. B32B 17/10045 136/256 |
| 2010/0143681 | A1 | 6/2010 | Yano et al. |
| 2011/0032205 | A1 | 2/2011 | David |
| 2011/0064953 | A1 | 3/2011 | O'Rourke et al. |
| 2011/0081542 | A1 | 4/2011 | Pilloy et al. |
| 2011/0244225 | A1 | 10/2011 | Hattori et al. |
| 2011/0281093 | A1 | 11/2011 | Gulati et al. |
| 2012/0060559 | A1 | 3/2012 | Boussaad et al. |
| 2012/0064352 | A1 | 3/2012 | Boussaad et al. |
| 2012/0094100 | A1 | 4/2012 | Takagi et al. |
| 2012/0235315 | A1 | 9/2012 | Wu et al. |
| 2014/0014260 | A1 | 1/2014 | Chowdhury et al. |
| 2015/0258750 | A1 | 9/2015 | Kang et al. |

FOREIGN PATENT DOCUMENTS

| | | | |
|---|---|---|---|
| EP | 2062862 B1 | 6/2012 | |
| GB | 1319846 A | 6/1973 | |
| GB | 2011316 A | 7/1979 | |
| GB | 2074089 A | 10/1981 | |
| GB | 2077995 A * | 12/1981 | ....... B32B 17/10018 |
| JP | 52117671 A | 10/1977 | |
| JP | 2009165279 A | 7/2009 | |
| JP | 2009184172 A | 8/2009 | |
| JP | 2010067344 A | 3/2010 | |
| JP | 2011065672 A | 3/2011 | |
| JP | 2011124360 A | 6/2011 | |
| JP | 2011162412 A | 8/2011 | |
| JP | 2011219352 A | 11/2011 | |
| JP | 2012199546 A | 10/2012 | |
| JP | 2013014135 A | 1/2013 | |
| KR | 961518 B1 | 6/2010 | |
| TW | 201219207 A | 5/2012 | |
| WO | 2011147429 A1 | 12/2011 | |
| WO | 2012037286 A1 | 3/2012 | |
| WO | 2014035942 A1 | 3/2014 | |
| WO | 2014166082 A1 | 10/2014 | |

OTHER PUBLICATIONS

"Chapter 17: Material Expansion Coefficients". Agilent Technologies Laser and Optics User's Manual, (2002); pp. 17-1 to 17-12. (Year: 2002).*
"Cambridge University Engineering Department Materials Data Book". Cambridge University, (2003); pp. 1-37 (Year: 2003).*
"Borosilicate Glass Properties". Schott Glass, pp. 16-17; Retrieved Aug. 29, 2017 (Year: 2017).*
Cuddihy et al. "Applications of Ethylene Vinyl Acetate as an Encapsulation Material for Terrestrial Photovoltaic Modules", Jet Propulsion Laboratory, (1983); pp. 1-71. (Year: 1983).*
"Audio, video and similar electronic apparatus—Safety requirements", International Electrotechnical Commission, CEI IEC 60065, Edition 7.1, Dec. 2005, pp. 1-346.
Verne, E., et al., "Surface characterization of silver-doped bioactive glass", Biomaterials 26 (2005), pp. 5111-5119.
Verne, E., et al., "Surface silver-doping of biocompatible glass to induce antibacterial properties. Part I: massive glass", J Mater Sci: Mater Med (2009), 20:733-740.
CN201480012706.8 First Office Action dated Nov. 30, 2016, China Patent Office.
TW103100523 Search Report dated Feb. 14, 2017, Taiwan Patent Office.
English Translation of JP2015551801 Office Action dated Aug. 22, 2017; 4 Pages; Japanese Patent Office.

* cited by examiner

| MATERIAL | YOUNG'S MODULUS (MPa) | POISSON'S RATIO | THERMAL EXP. COEF. (ppm/C) |
|---|---|---|---|
| STAINLESS STEEL | 200000 | 0.3 | 17 |
| ALUMINUM | 70000 | 0.35 | 23.1 |
| COPPER | 110000 | 0.34 | 16.5 |
| WILLOW/EXG | 73600 | 0.23 | 3.17 |
| ADHESIVES | <500 | 0.4-0.5 | 10-200 |

STRENGTHENED LAMINATED GLASS STRUCTURES

This application claims the benefit of priority under 35 U.S.C. § 119 of U.S. Provisional Application Ser. No. 61/749,671 filed on Jan. 7, 2013 the content of which is relied upon and incorporated herein by reference in its entirety.

FIELD

The present disclosure relates to glass-laminate structures and, more particularly, to strengthened/damage and impact resistant laminated glass structures.

BACKGROUND

Laminated glass structures may be used as components in the fabrication of various appliances, automobile components, architectural structures or electronic devices. For example, laminated glass structures may be incorporated as cover glass for various end products such as refrigerators, decorative glazing, televisions, or as embedded touch laminates for smart interactive displays. However, applications that utilize laminated glass structures are subject to strength and impact limitations. Additionally, some electronics require specially shaped laminated glass structures, such as laminated glass sheets with curved, shaped, beveled, bezeled, or otherwise contoured profiles. Accordingly, there is a need for apparatuses and methods for forming strengthened and/or impact resistant laminated glass structures.

SUMMARY

One technique to improve the mechanical reliability of flexible glass is to laminate, or bond, the flexible glass to one or more laminate materials or substrates of unique structures. Flexible glass may be glass having a thickness of 300 microns or less, including but not limited to, 300, 275, 250, 225, 200, 190, 180, 170, 160, 150, 140, 130, 120, 110, 100, 90, 80, 70, 60, 50, 40, 30, 20, or 10 microns. Depending on the mechanical strength and impact resistance requirements of a laminated glass structure, as well as the expected bending stresses and direction of bending in the intended application, a laminated glass structure can be designed to meet various mechanical requirements according to the concepts disclosed herein. When used properly, the laminated glass structures can offer improved mechanical reliability and impact resistance performance over an unlaminated flexible glass.

For example, as discussed below, impact resistance of a laminated glass structure may be defined by performance in a ball drop test using a ball drop testing apparatus. When a stainless steel ball, having a diameter of 51 mm and a weight of 535 g, is dropped from a state of rest and a fixed height onto a laminated glass structure supported by a foam block positioned on an aluminum table, the laminated glass structure may deform such that a dimple is formed in the laminate material or substrate that the flexible glass is laminated or bonded to, while the flexible glass remains intact and adapts to the shape of the non-glass substrate. If the flexible glass does not fracture through its thickness and no portion of the flexible glass is separated from the laminated glass structure, the laminated glass structure may be considered to have an impact resistance of the height the stainless steel ball was dropped from, in other words, the laminated glass structure may be said to have withstood such a ball drop test.

Additional features and advantages will be set forth in the detailed description which follows, and in part will be readily apparent to those skilled in the art from the description or recognized by practicing the disclosure as exemplified in the written description and the appended drawings. It is to be understood that both the foregoing general description and the following detailed description are merely exemplary of the disclosure, and are intended to provide an overview or framework to understanding the nature and character of the disclosure as it is claimed.

The accompanying drawings are included to provide a further understanding of principles of the disclosure, and are incorporated in and constitute a part of this specification. The drawings illustrate one or more embodiment(s), and together with the description serve to explain, by way of example, principles and operation of the disclosure. It is to be understood that various features of the disclosure disclosed in this specification and in the drawings can be used in any and all combinations. By way of non-limiting example the various features of the disclosure may be combined with one another according to the following aspects.

According to a first aspect, there is provided a laminated glass structure comprising:
a non-glass substrate; and
a glass sheet bonded to the non-glass substrate to form the laminated glass structure, wherein the laminated glass structure withstands a ball drop test wherein a 535 g stainless steel ball is dropped from a height of at least 0.8 m onto the laminated glass structure, with the glass sheet being impacted by the ball;
wherein the glass sheet has a thickness such that the glass sheet exhibits, without cracking, deformation to adapt to any shape change of the non-glass substrate as imparted by the ball of the ball drop test.

According to a second aspect, there is provided the laminated glass structure of aspect 1, wherein the ball is dropped from a height of 0.9 m.

According to a third aspect, there is provided the laminated glass structure of aspect 1, wherein the ball is dropped from a height of 1 m.

According to a fourth aspect, there is provided the laminated glass structure of aspect 1, wherein the ball is dropped from a height of 1.295 m.

According to a fifth aspect, there is provided the laminated glass structure of aspect 1, wherein the ball is dropped from a height of 1.45 m.

According to a sixth aspect, there is provided the laminated glass structure of any one of aspects 1 to 5, wherein the glass sheet has a thickness of 300 µm or less.

According to a seventh aspect, there is provided the laminated glass structure of any one of aspects 1 to 6, wherein the laminated glass structure is supported by a sheet of 25.4 mm thick extruded polystyrene foam sheet that is positioned on top of an aluminum testing table such that the glass sheet is impacted by the ball and the non-glass substrate is facing the foam sheet.

According to an eighth aspect, there is provided the laminated glass structure of any one of aspects 1 to 7, wherein the non-glass substrate comprises a metal or metal alloy.

According to a ninth aspect, there is provided the laminated glass structure of any one of aspects 1 to 8, wherein the non-glass substrate comprises one or more of stainless steel, aluminum, nickel, brass, bronze, titanium, tungsten, copper, cast iron and noble metals.

According to a tenth aspect, there is provided the laminated glass structure of any one of aspects 1 to 9, further comprising an adhesive layer positioned between the glass sheet and the non-glass substrate.

According to an eleventh aspect, there is provided the laminated glass structure of aspect 10, wherein the adhesive layer has a thickness of no more than about 1000 μm.

According to a twelfth aspect, there is provided the laminated glass structure of aspects 10 or 11, wherein the adhesive layer is optically clear on cure.

According to a thirteenth aspect, there is provided the laminated glass structure of any one of aspects 10 to 12, wherein no air bubbles within the adhesive layer have a diameter of greater than or equal to 100 microns.

According to a fourteenth aspect, there is provided the laminated glass structure of any one of aspects 10 to 13, wherein the adhesive layer is opaque.

According to a fifteenth aspect, there is provided the laminated glass structure of any one of aspects 10 to 14, wherein the adhesive layer is thermally cured.

According to a sixteenth aspect, there is provided the laminated glass structure of any one of aspects 10 to 14, wherein the adhesive layer is cured by exposure to ultraviolet light.

According to a seventeenth aspect, there is provided the laminated glass structure of any one of aspects 10 to 16, wherein the adhesive layer is a sheet or film of adhesive.

According to an eighteenth aspect, there is provided the laminated glass structure of aspect 17, wherein the sheet or film of adhesive has a decorative pattern visible through the glass sheet.

According to a nineteenth aspect, there is provided the laminated glass structure of any one of aspects 1 to 18, wherein the non-glass substrate has a thickness of no more than about 5 mm.

According to a twentieth aspect, there is provided the laminated glass structure of any one of aspects 1 to 19, wherein the non-glass substrate has a coefficient of thermal expansion (CTE) that is at least about 2 times a CTE of the glass sheet.

According to a twenty-first aspect, there is provided the laminated glass structure of any one of aspects 1 to 20, wherein the compressive stress is at least about 30 MPa across its thickness.

According to a twenty-second aspect, there is provided the laminated glass structure of any one of aspects 1 to 21, wherein the compressive stress is at least about 80 MPa across its thickness.

According to a twenty-third aspect, there is provided the laminated glass structure of any one of aspects 1 to 22, wherein the non-glass substrate has a CTE that is at least about 5 times a CTE of the glass sheet.

According to a twenty-fourth aspect, there is provided the laminated glass structure of any one of aspects 1 to 23, wherein the glass sheet is a first glass sheet, the laminated structure comprising a second glass sheet, wherein the non-glass substrate is located between the first and second glass sheets.

According to a twenty-fifth aspect, there is provided the laminated glass structure of any one of aspects 1 to 24, wherein the non-glass substrate has a Young's Modulus greater than or equal to about 30,000 MPa and less than or equal to about 500,000 MPa.

According to a twenty-sixth aspect, there is provided the laminated glass structure of any one of aspects 1 to 25, wherein the glass sheet has a first CTE that is greater than or equal to about 2 ppm/C and less than or equal to about 5 ppm/C and the non-glass substrate has a second CTE greater than or equal to about 10 ppm/C.

According to a twenty-seventh aspect, there is provided the laminated glass structure of any one of aspects 1 to 26, wherein the glass sheet has anti-microbial properties.

According to a twenty-eighth aspect, there is provided a laminated glass structure comprising:

a glass sheet having a thickness of no more than about 300 μm; and a metal substrate laminated to a surface of the glass sheet, so as to achieve a compressive stress of at least about 30 MPa across a thickness of the glass sheet.

According to a twenty-ninth aspect, there is provided the laminated glass structure of aspect 28, wherein the compressive stress across the thickness of the glass sheet is at least about 80 MPa.

According to a thirtieth aspect, there is provided the laminated glass structure of aspects 28 or 29, wherein the compressive stress across the thickness of the glass sheet is at least about 100 MPa.

According to a thirty-first aspect, there is provided the laminated glass structure of any one of aspects 28 to 30, wherein the metal substrate comprises one or more of stainless steel, aluminum, nickel, brass, bronze, titanium, tungsten, copper, cast iron and noble metals.

According to a thirty-second aspect, there is provided the laminated glass structure of any one of aspects 28 to 31, further comprising a layer of adhesive positioned between and in contact with the glass sheet and the metal substrate.

According to a thirty-third aspect, there is provided the laminated glass structure of aspect 32, wherein the layer of adhesive is optically clear on cure.

According to a thirty-fourth aspect, there is provided the laminated glass structure of any one of aspects 32 to 33, wherein the layer of adhesive has a thickness of no more than about 1000 μm.

According to a thirty-fifth aspect, there is provided the laminated glass structure of any one of aspects 28 to 34, wherein the metal substrate has a thickness of no more than about 5 mm.

According to a thirty-sixth aspect, there is provided the laminated glass structure of any one of aspects 28 to 35, wherein the metal substrate has a coefficient of thermal expansion (CTE) that is at least about 2 times a CTE of the glass sheet.

According to a thirty-seventh aspect, there is provided the laminated glass structure of any one of aspects 28 to 36, wherein the metal substrate has a CTE that is at least about 5 times the CTE of the glass sheet.

According to a thirty-eighth aspect, there is provided the laminated glass structure of any one of aspects 28 to 37, comprising at least three layers including a first glass sheet layer, a second glass sheet layer, and a metal substrate layer located between the first and second glass sheet layers.

According to a thirty-ninth aspect, there is provided the laminated glass structure of any one of aspects 28 to 38, wherein the metal substrate has a Young's Modulus greater than or equal to about 30,000 MPa and less than or equal to about 500,000 MPa.

According to a fortieth aspect, there is provided the laminated glass structure of any one of aspects 32 to 39, wherein the layer of adhesive is thermally cured.

According to a forty-first aspect, there is provided the laminated glass structure of any one of aspects 32 to 39, wherein the layer of adhesive is cured by exposure to ultraviolet light.

According to a forty-second aspect, there is provided the laminated glass structure of any one of aspects 32-39, wherein the layer of adhesive is opaque.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
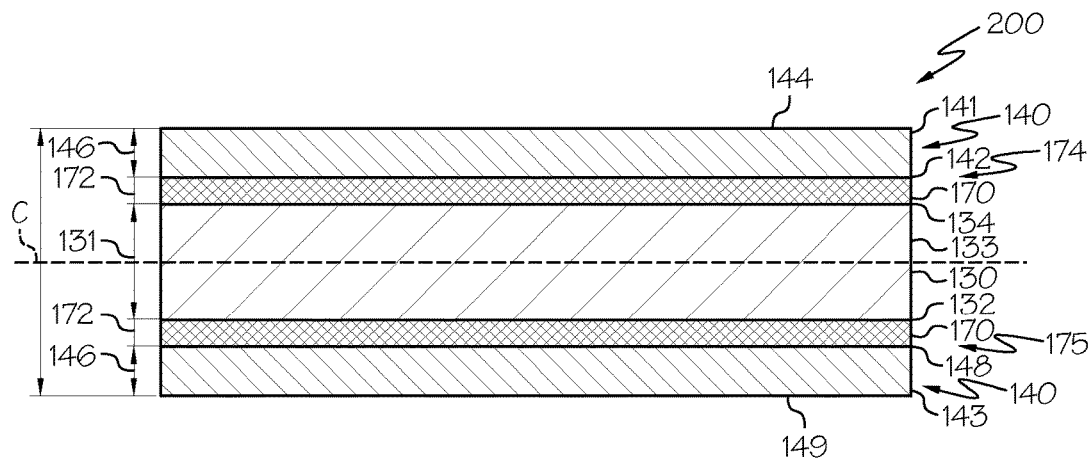
FIGS. 1 and 2 depict a cross-sectional view of one embodiment of a symmetric laminated glass structure and an associated compressive stress test graph in accordance with aspects of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Although glass is an inherently strong material, its strength and mechanical reliability is a function of its surface defect or flaw size density distribution and the cumulative exposure of stress to the material over time. During an entire product life cycle, a laminated glass structure may be subjected to various kinds of static and dynamic mechanical stresses. Embodiments described herein generally relate to laminated glass structures where a flexible glass sheet is strengthened using a non-glass substrate. Particular examples discussed herein relate to laminated glass structures where the non-glass substrate is a metal or metal alloy, such as stainless steel, aluminum, nickel, brass, bronze, titanium, tungsten, copper, cast iron or a noble metal. A relatively large coefficient of thermal expansion (CTE) mismatch between the non-glass substrate and the flexible glass sheet is utilized to improve the impact resistance by laminating the non-glass substrate to the flexible glass sheet at an elevated lamination temperature followed by a slow cooling. Such an elevated lamination temperature lamination approach can create a uniformly distributed compressive residual stress across the thickness of the flexible glass sheet once the laminated glass structure is cooled.

Laminated Glass Structures

Figure 3:
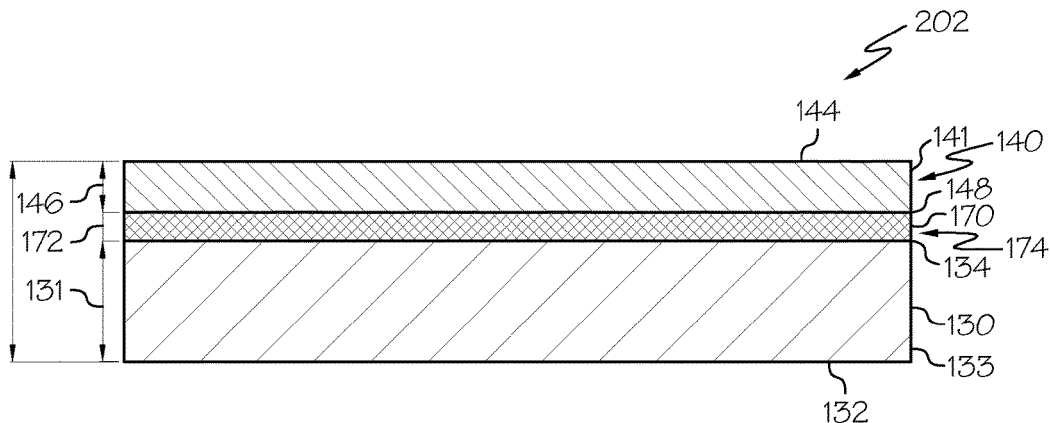
FIGS. 3 and 4 depict a cross-sectional view of one embodiment of an asymmetric laminated glass structure with an adhesive layer and an associated compressive stress test graph in accordance with aspects of the disclosure.

Referring to FIGS. 1 and 3, cross-sectional views of two exemplary laminated glass structures 200 and 202 are illustrated. Referring first to FIG. 1, the laminated glass structure 200 is generally referred to as a symmetric laminated glass structure and includes a first outermost flexible glass layer 141 that is formed of a flexible glass sheet 140, a second outermost flexible glass layer 143 that is formed of another flexible glass sheet 140 and a non-glass substrate layer 133 that is sandwiched between and laminated to the first and second flexible glass layers 141 and 143. A symmetric laminated glass structure 200, shown in FIG. 1, is constructed such that the layers below a central plane C of the laminated glass structure 200 form a mirror image of the layers above the central plane C, while asymmetric laminated glass structures, as shown in FIG. 3, do not have such a mirror image about their central planes. The non-glass substrate layer 133 is formed of a non-glass substrate 130, such as wood, metals, and/or metal alloys, for example stainless steel, copper, nickel, brass, bronze, titanium, tungsten, cast iron, aluminum, ceramic, composite, or another polymer or rigid material or combinations of these materials. In many embodiments, the non-glass substrate 130 is formed of a metal or metal alloy.

Adhesive layers 174, 175, may be formed of an adhesive material 170 that may be used to laminate the first and second flexible glass layers 141, 143 to the non-glass substrate layer 133 at the interfaces between their respective broad surfaces 134, 142 and 132, 148. The adhesive material 170 may be a non-adhesive interlayer, an adhesive, a sheet or film (which can be a dry film or a liquid film that is later cured) of adhesive, a liquid adhesive, a powder adhesive, a pressure sensitive adhesive, an ultraviolet light adhesive, a thermal adhesive, or other similar adhesive or combination thereof. The adhesive material 170 may assist in attaching the flexible glass 140 to the non-glass substrate 130 during lamination. Some examples of adhesive material 170 are commercially available as Norland 68, 3M OCA 8211, 3M 8212, DuPont SentriGlas, DuPont PV 5411, silicones, acrylates, Japan World Corporation material FAS, encaptulant material, polyurethane, polyvinyl butyral resin, wood glue or like, or an optically clear adhesive. The adhesive layer 174 may be thin, having a thickness less than or equal to about 1000 µm, including less than or equal to about 900 µm, including less than or equal to about 800 µm, including less than or equal to about 700 µm, including less than or equal to about 600 µm, including less than or equal to about 500 µm, including less than or equal to about 400 µm, including less than or equal to about 300 µm, about 250 µm, including less than or equal to about 200 µm, including less than or equal to about 150 µm, including less than or equal to about 100 µm, less than or equal to about 50 µm, less than or equal to about 25 µm, and sub-micron thicknesses. The adhesives may also contain other functional components such as color, decoration, heat or UV resistance, anti-reflective (AR) filtration etc. The adhesive material 170 may be optically clear on cure, or may otherwise be opaque. In embodiments where the adhesive material 170 is a sheet or film of adhesive, the adhesive material 170 may have a decorative pattern or design visible through the thickness of the flexible glass, as shown in FIG. 5.

Figure 5:
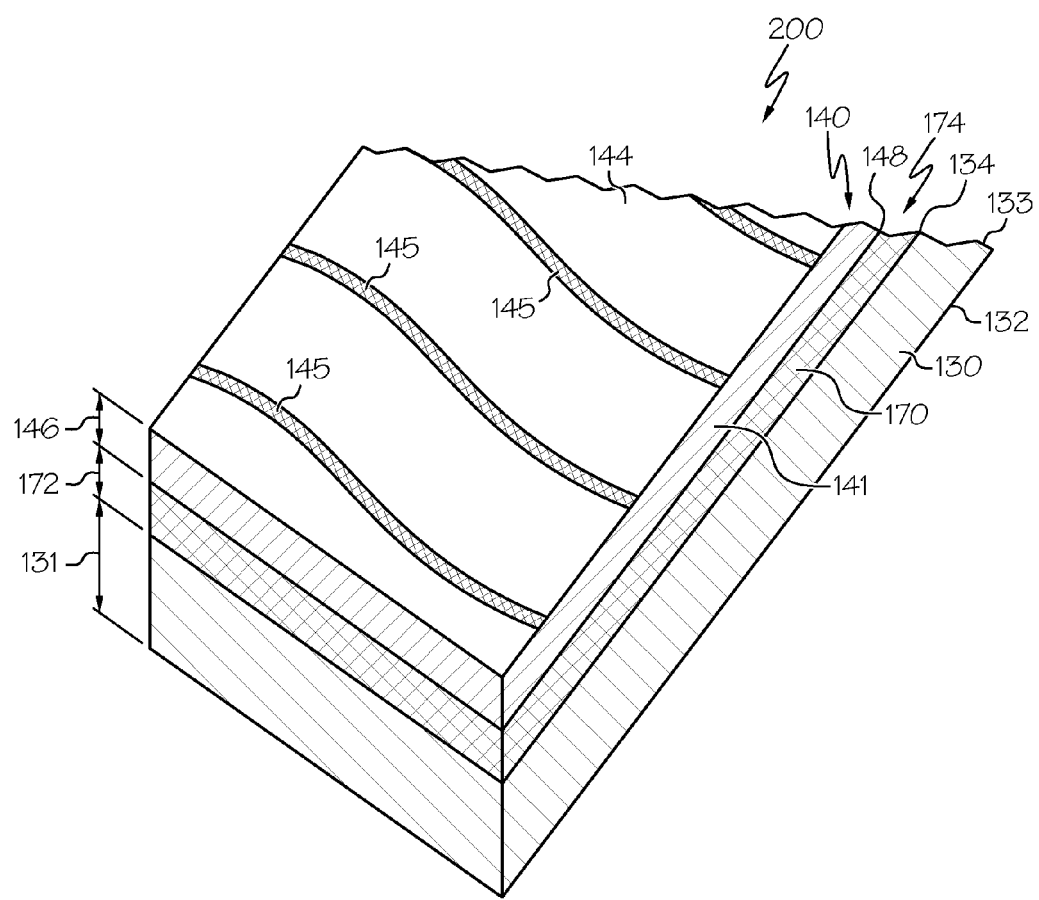
FIG. 5 depicts a cross-sectional view of the symmetric laminated glass structure of FIG. 1 with a decorative pattern on an adhesive layer in accordance with aspects of the disclosure.

In FIG. 5, the laminated glass structure 200 includes an adhesive layer 174 formed of a sheet or film of adhesive material 170. The adhesive material 170 has a pattern of stripes 145 that are visible from the outer surface 144 of the flexible glass layer 141. Some air bubbles may become entrained in the laminated glass structure during or after lamination, but air bubbles having a diameter of equal to or less than 100 µm may not affect the impact resistance of the laminated glass structure. Formation of air bubbles may be reduced by use of a vacuum system or application of pressure to a surface of the structure. In other embodiments, the flexible glass layer may be laminated without adhesive. In yet some other embodiments, the second flexible glass layer 143 may be formed of a flexible glass having a chemical composition different than the flexible glass sheet 140 of the first flexible glass layer 141. Manipulation of the bond strength between layers 141, 174, 133 of the laminated glass structure may also affect the impact resistance of the laminated glass structure.

Figures 6, 7:
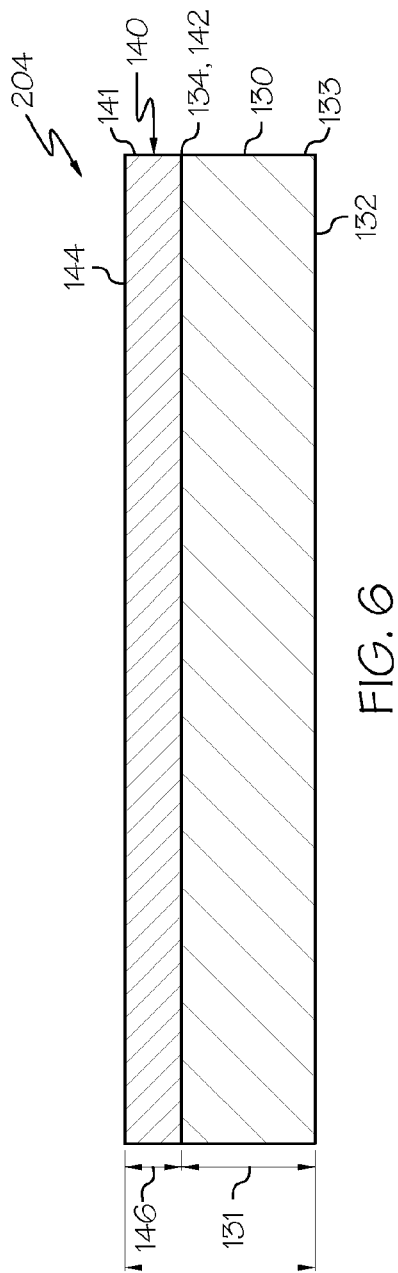
FIG. 6 depicts a cross-sectional view of one embodiment of an asymmetric laminated glass structure without an adhesive layer in accordance with aspects of the disclosure.
FIG. 7 provides a table listing material properties of laminated glass structure samples formed and tested in accordance with aspects of the disclosure.

While FIG. 1 illustrates outermost flexible glass layers 141, 143 in a symmetric laminated glass structure 200, FIG. 3 illustrates an alternative laminated glass structure 202 with only a first outermost flexible glass layer 141 laminated to a non-glass substrate layer 133, generally referred to as an asymmetric laminated glass structure. Again, an adhesive layer 174 may be used to laminate the first outermost flexible glass layer 141 to the non-glass substrate layer 133 at the interfaces between their respective broad surfaces 134, 142. FIG. 6 illustrates another laminated glass structure 204 including a first outermost flexible glass layer 141 laminated to a non-glass substrate layer 133 without the adhesive layer 174. FIGS. 1, 3, 5 and 6 illustrate exemplary laminated glass structures with a number of layers, however, other laminated glass structures having more or less layers may be utilized.

The flexible glass sheet 140 may have a thickness 146 of about 0.3 mm or less including but not limited to thicknesses of, for example, about 0.01-0.05 mm, about 0.05-0.1 mm, about 0.1-0.15 mm, about 0.15-0.3 mm, 0.3, 0.275, 0.25, 0.225, 0.2, 0.19, 0.18, 0.17, 0.16, 0.15, 0.14, 0.13, 0.12, 0.11, 0.10, 0.09, 0.08 0.07, 0.06, 0.05, 0.04, 0.03, 0.02, or 0.01 mm. The flexible glass sheet 140 may be formed of glass, a glass ceramic, a ceramic material or composites thereof. A fusion process (e.g., downdraw process) that forms high quality flexible glass sheets can be used in a variety of devices such as flat panel displays. Glass sheets produced in a fusion process have surfaces with superior flatness and smoothness when compared to glass sheets produced by other methods. The fusion process is described in U.S. Pat. Nos. 3,338,696 and 3,682,609. Other suitable glass sheet forming methods include a float process, updraw and slot draw methods. Additionally, the flexible glass sheet 140 may also contain anti-microbial properties by using a chemical composition for the glass including an Ag ion concentration on the surface in the range greater than 0 to 0.047 µg/cm$^2$, further described in U.S. Patent Application Publication No. 2012/0034435 A1. The flexible glass 140 may also be coated with a glaze composed of silver, or otherwise doped with silver ions, to gain the desired anti-microbial properties, further described in U.S. Patent Application Publication No. 2011/0081542 A1. Additionally, the flexible glass 140 may have a molar composition of 50% $SiO_2$, 25% CaO, and 25% $Na_2O$ to achieve the desired anti-microbial effects.

Figure 2:
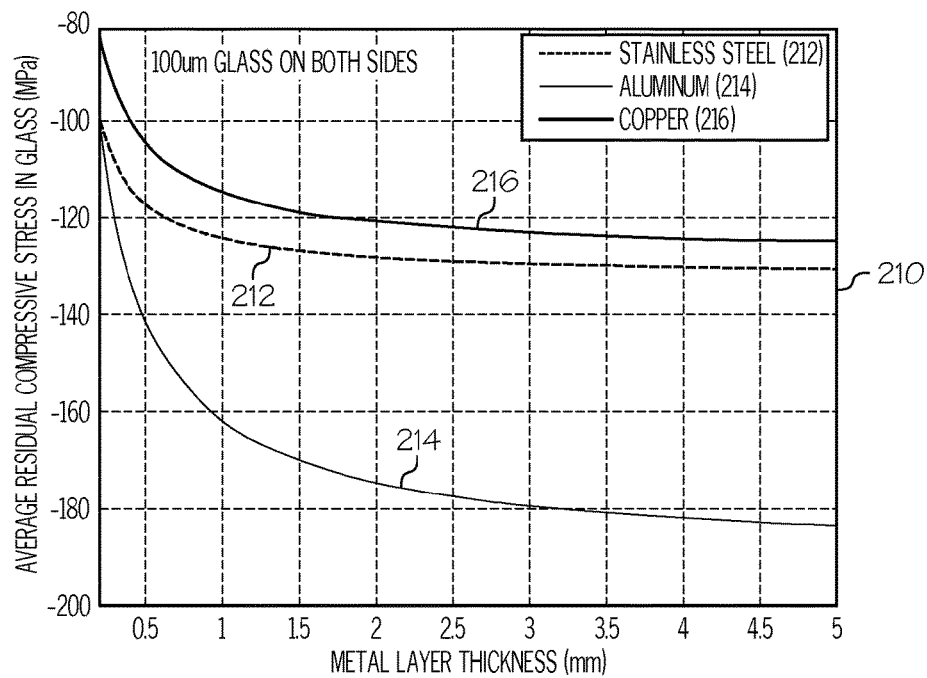
Figure 4:
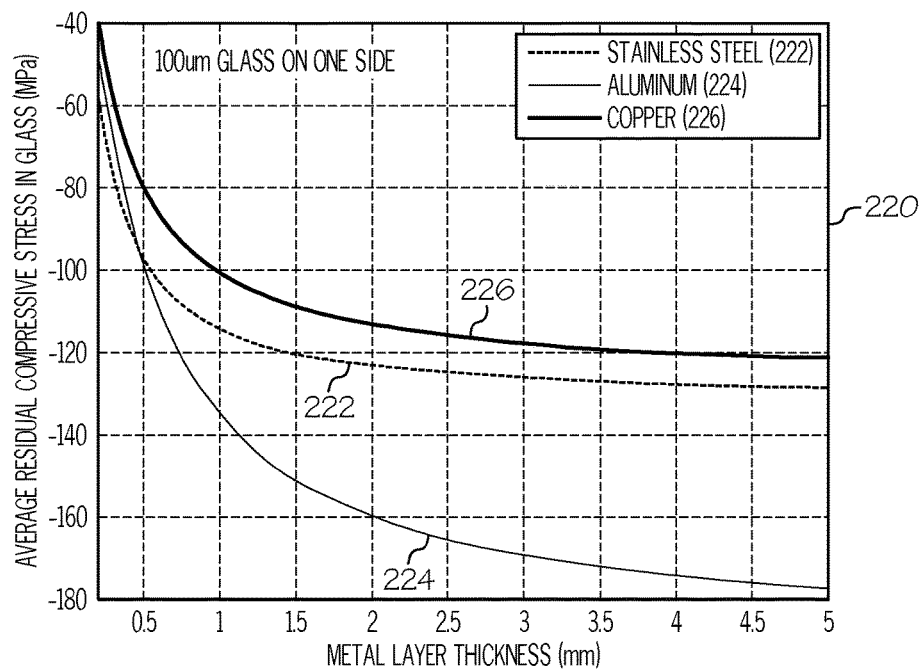

Referring now to FIGS. 2 and 4, exemplary stress diagrams 210 and 220 showing residual compressive stress in the flexible glass sheet 140 versus increasing non-glass substrate layer thickness are illustrated for the corresponding laminated glass structures 200 (FIG. 1) and 202 (FIG. 3). For these exemplary stress diagrams 210 and 220, the non-glass substrate layers 137 are formed of three different non-glass substrates 130: stainless steel, aluminum, and copper. The material properties of these non-glass substrates 130 are found in FIG. 7.

Referring first to FIG. 2, the residual compressive stresses in the flexible glass layers 141 and 143 (100 µm in thickness) of the laminated glass structure 200 are substantially uniform across the thicknesses of the flexible glass layers 141 and 143. The residual compressive stresses are generated by laminating the non-glass substrate 130 (of thicknesses ranging from about 0.1 mm to about 5 mm) to the flexible glass layers 141 and 143, as shown in FIG. 1, at an elevated lamination temperature and then cooling to room temperature at a cooling rate depending on a thermal mass of the non-glass substrate 130, such as about 3 degrees Fahrenheit per minute or about 4 degrees Fahrenheit per minute. The elevated lamination temperature is greater than room temperature and less than a deformation temperature specific to the non-glass substrate, including but not limited to about 165 degrees Celsius, about 140 degrees Celsius, or about 110 degrees Celsius. Further, while a tri-layer laminated glass structure is illustrated by FIG. 1, the number of layers can be greater or less than three layers and selected depending on, for example, the end use and processing requirements. Various other layered laminate examples will be described herein.

Referring now to FIG. 4, the residual compressive stresses in the flexible glass layer 141 (100 μm in thickness) of the laminated glass structure 202 may be substantially or almost uniform across the thickness of the flexible glass layer 141. The residual compressive stresses are generated by laminating the non-glass substrate 130 (of thicknesses ranging from about 0.1 mm to about 5 mm) to the flexible glass layer 141, as shown in FIG. 3, at an elevated lamination temperature and then cooling to room temperature.

Strengthening Symmetric Laminated Glass Structures

Although not wishing to be bound by theory, the laminated glass structure of the present disclosure may have increased impact/damage resistance due to the presence of a compressive stress in the glass layer. The present disclosure provides apparatuses and methods for strengthening flexible glass sheets that utilizes a large CTE mismatch (e.g., about 2 times or more, such as about 5 times or more, such as about 10 times or more) between the non-glass substrate 130 and the flexible glass sheet 140 by laminating the non-glass substrate 130 and the flexible glass sheet 140 (e.g., as shown in FIG. 1) at an elevated lamination temperature and then slowly cooling to create a residual compressive stress across the thickness 146 of the flexible glass sheet 140. The non-glass substrate 130 should be allowed to thermally expand, at least to some degree, relative to the flexible glass sheet 140 due to the large CTE mismatch between the flexible glass sheet 140 and the non-glass substrate 130 before laminating the non-glass substrate 130 to the flexible glass sheet 140. Once laminated, the laminated glass structure 200 may be controllably cooled (e.g., preferably about 1-2° C./min or less) back down to room temperature, fully curing the adhesive layers 174, 175, which introduces the compressive stress into the flexible glass 140. In some embodiments, the CTE mismatch may be at least about 3 ppm/° C. or more, such as about 6 ppm/° C. or more, such as about 9 ppm/° C. or more, such as about 12 ppm/° C. or more, such as about 15 ppm/° C. or more, such as about 20 ppm/° C. or more, such as about 27 ppm/° C. or more, such as about 50 ppm/° C. or more. The laminated glass structures may be classified as symmetric (for example 200) and asymmetric (for example 202, 204). As explained above, the symmetric laminated glass structure 200 is constructed such that the layers below a central plane C (shown in FIG. 1) of the laminated glass structure 200 form a mirror image of the layers above the central plane C and asymmetric laminated glass structures 202, 204 do not have such a mirror image about their central planes.

For symmetric laminated glass structures, such as laminated glass structure 200, formed of two different materials and having three or more layers with different CTE and laminated at an elevated lamination temperature, the compressive stress $\sigma_g$ across the thickness 146 of the flexible glass 140 at room temperature (assuming bi-axial deformation) is given by:

$$\sigma_g = -\frac{E_g}{(1-v_g) + E_g t_g (1-v_m)/E_m t_m}(\alpha_m - \alpha_g)(T_{lam} - T_{room}),$$

$$\sigma_m = \frac{E_g E_m t_g}{E_g t_g (1-v_m) + E_m t_m (1-v_g)}(\alpha_m - \alpha_g)(T_{lam} - T_{room})$$

wherein $\sigma_m t_m + \sigma_g t_g = 0$, and

E is Young's modulus, α is linear thermal expansion coefficient, t is total thicknesses of one type of material, v is Poisson's ratio, and the subscripts "g" and "m" refer to "glass" and "material (non-glass substrate)", respectively. $T_{lam}$ refers to the curing temperature of the adhesive used in the lamination process, and $T_{room}$ refers to room temperature.

Thus, the compressive stress $\sigma_g$ in the flexible glass can be increased by one or more of 1. reducing the glass layer thickness $t_g$;
2. increasing the Young's modulus $E_g$ of the flexible glass;
3. increasing the Young's modulus $E_m$ of the non-glass substrate layer;
4. increasing the thickness $t_m$ of the non-glass substrate layer;
5. increasing the thermal expansion coefficient difference between the flexible glass 140 and the non-glass substrate 130; and
6. increasing the lamination temperature $T_{lam}$.

While larger compressive stresses (e.g., 30 MPa or more, such as 50 MPa or more, such as 60 MPA or more, such as about 70 MPa or more such as about 80 MPa or more, such as about 90 MPA or more, such as about 100 MPa or more, such as about 110 MPa or more) may be desired across the thickness 146 of the flexible glass sheet 140, there are limits on the amount of compressive stress that can be introduced. For example, to achieve large compressive stress $\sigma_g$ in the flexible glass sheet 140, one approach is to set the lamination temperature $T_{lam}$ as high as possible. However, the upper end of this lamination temperature $T_{lam}$ should not exceed limits set by specific properties of the laminated glass structure, such as the working temperature limit of any adhesive used. Any adhesive layer 174 will have minimal impact on the compressive stress $\sigma_g$, such as less than 10 MPa, across the thickness 146 of the flexible glass sheet 140 as the adhesive layer 174 is soft and may have a Young's modulus that is lower than both the Young's modulus of the flexible glass 140 and the non-glass substrate 130. Material and structural integrity should be considered in providing product reliability. Thus, various limits may affect the amount of compressive stress that can be introduced to the flexible glass sheet 140.

The following equation approximates the maximum compressive stress $\sigma_{g\_max}$ in a flexible glass sheet 140 of a bi-axial laminated glass structure. This equation applies to both symmetric and asymmetric laminated glass structures:

$$\sigma_{g\_max} = -\frac{E_g}{1-v_g}(\alpha_m - \alpha_g)(T_{lam} - T_{room}).$$

For the laminated glass structure of FIG. 1, for example, assuming a difference between lamination temperature $T_{lam}$ and room temperature $T_{room}$ of 100 degrees Celsius, a maximum compressive stress $\sigma_{g\_max}$ may be generated in the flexible glass sheet 140 of 132 MPa for the symmetric laminated glass structure 200 where the metal substrate material is stainless steel, 190 MPa for a symmetric laminated glass structure 200 where the metal substrate material is aluminum, and 127 MPa for a symmetric laminated glass structure 200 where the metal substrate material is copper. These calculations were performed using the numerical values provided in FIG. 7.

Strengthening Asymmetric Laminated Glass Structures

Lamination processes may also be used to manipulate or affect stress profiles in asymmetric laminated glass structures, such as the laminated glass structures 202 and 204 (FIGS. 3 and 5). In these embodiments, the substrate material layer 133 may be allowed to thermally expand relative to the flexible glass 140 due to the large CTE mismatch between the flexible glass 140 and the non-glass substrate 130 before laminating the non-glass substrate 130 to the flexible glass 140. However, due to the asymmetric nature of the laminated glass structures 202, 204, uniaxial or biaxial bending may be introduced in the flexible glass and the substrate material layer. Additionally, the asymmetrical laminated glass structure 202, 204 may warp when cooled to room temperature.

Figure 8:
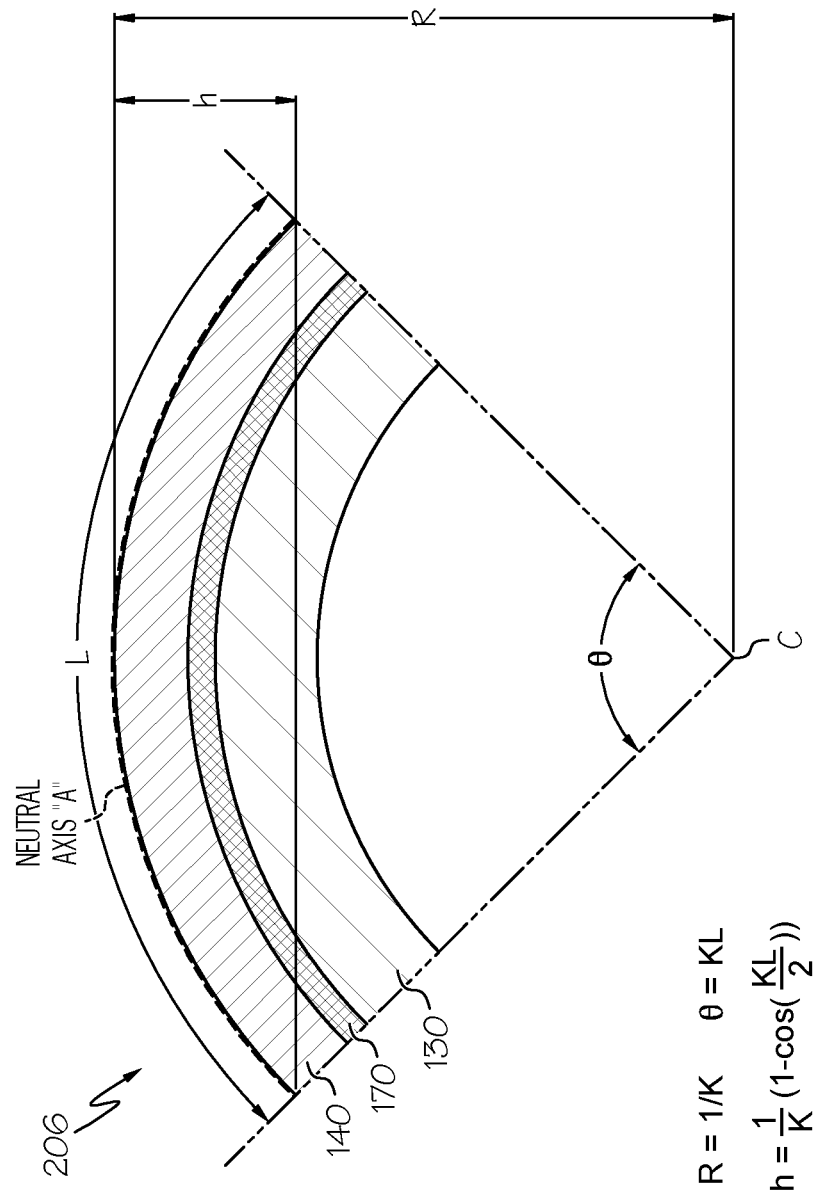
FIG. 8 schematically illustrates possible warping on the asymmetric laminated glass structure of FIG. 6 in accordance with aspects of the disclosure.

Referring to FIG. 8, a uniaxial bending curvature induced by a CTE mismatch in an asymmetric laminated glass structure 206 is given by (assuming plane stress and the flexible glass 140 and non-glass substrate 130 have the same width and length dimensions):

$$\kappa = \frac{6(\alpha_m - \alpha_g)t_g t_m(T_{lam} - T_{room})(t_g + t_m)}{\frac{E_g t_g^4}{E_m} + 4t_g^3 t_m + 6t_g^2 t_m^2 + 4t_g t_m^3 + E_m t_m^4 / E_g},$$

wherein:
κ is bending curvature, E is Young's modulus, a is linear thermal expansion coefficient, t is total thicknesses of one type of material, and the subscripts "g" and "m" refer to "glass" and "substrate material," respectively. $T_{lam}$ refers to the curing temperature of the adhesive used in the lamination process, and $T_{room}$ refers to room temperature.

Bending curvature κ is related to the radius R measured from center C to the neutral axis A by: R=1/κ. Height h to the neutral axis can be determined by:

$$h = R\left(1 - \cos\left(\frac{\theta}{2}\right)\right) = \frac{1}{\kappa}\left(1 - \cos\left(\frac{\kappa L}{2}\right)\right).$$

For biaxial bending, E is replaced in the above equation by $$\left(\frac{E}{1-\nu}\right)$$

and for uniaxial plane strain bending, E is replaced in the above equation by $$\left(\frac{E}{1-\nu^2}\right).$$

Thus, bending characteristics of an asymmetric laminated glass structure can be determined where the material properties and lamination temperatures are known.

In some instances, for asymmetrical laminated glass structures 202, 204, the compressive stress σ may not be uniform across the thickness 146 of the flexible glass sheet 140. The compressive stress $\sigma_{g\_top}$ across the thickness 146 of the flexible glass sheet 140 may be calculated using the following equation for a top surface 144, as positioned in FIGS. 3-4, of the flexible glass 140:

$$\sigma_{g\_top} = \\ -\frac{E_g E_m t_m(E_m t_m^3 + E_g t_g^2(2t_g + 3t_m))}{E_g^2 t_g^4 + E_m^2 t_m^4 + 2E_g E_m t_g t_m(2t_g^2 + 3t_g t_m + 2t_m^2)}(\alpha_m - \alpha_g)(T_{lam} - T_{room})$$

wherein:
E is Young's modulus, a is linear thermal expansion coefficient, t is total thicknesses of one type of material, and the subscripts "g" and "m" refer to "glass" and "material (substrate material)", respectively. $T_{lam}$ refers to the curing temperature of the adhesive used in the lamination process, and $T_{room}$ refers to room temperature.

The compressive stress $\sigma_{g\_bot}$ across the thickness 146 of the flexible glass sheet 140 may be calculated using the following equation for a bottom surface 148, as positioned in FIGS. 1 and 3, of the flexible glass 140:

$$\sigma_{g\_bot} = \\ -\frac{E_g E_m t_m(E_m t_m^3 + E_g t_g^2(4t_g + 3t_m))}{E_g^2 t_g^4 + E_m^2 t_m^4 + 2E_g E_m t_g t_m(2t_g^2 + 3t_g t_m + 2t_m^2)}(\alpha_m - \alpha_g)(T_{lam} - T_{room}).$$

The average compressive stress $\sigma_{g\_avg}$ across the thickness 146 of the flexible glass sheet 140 may be calculated using the following equation:

$$\sigma_{g\_avg} = \\ -\frac{E_g E_m t_m(E_m t_m^3 + E_g t_g^3)}{E_g^2 t_g^4 + E_m^2 t_m^4 + 2E_g E_m t_g t_m(2t_g^2 + 3t_g t_m + 2t_m^2)}(\alpha_m - \alpha_g)(T_{lam} - T_{room}).$$

When calculating biaxial bending for any of the above referenced equations, E is replaced by $$\left(\frac{E}{1-\nu}\right).$$

When calculating uniaxial plane strain bending for any of the above referenced equations, E is replaced by $$\left(\frac{E}{1-\nu^2}\right).$$

Based on the above referenced equations, the compressive stress σ in the flexible glass sheet 140 can be increased by one or more of the following:
1. reducing the thickness $t_g$ of the flexible glass sheet 140
2. increasing the Young's modulus $E_g$ of the flexible glass 140
3. increasing the Young's modulus $E_m$ of the non-glass substrate 130
4. increasing the thickness $t_m$ of the non-glass substrate 130
5. increasing the coefficient of thermal expansion difference between the flexible glass 140 and the non-glass substrate 130
6. increasing the lamination temperature.

The adhesive layer 174 will typically have a minimal impact, such as less than 10 MPa, on the compressive stress σ across the thickness 146 of the flexible glass sheet 140 as the adhesive layer 174 will typically be soft and have a Young's modulus that is lower than both the Young's modulus of the flexible glass 140 and the Young's modulus of the non-glass substrate 130. But it should be noted that the appropriate choice of the adhesive will enhance the impact resistance of the laminated structure through ionic or chemical bonding and/or mechanical structural interlock and shrinkage based compression. Finally, the maximum compressive stress $\sigma_{g\_max}$ for asymmetric laminated glass structures is the same as for the symmetric laminated glass structures discussed above.

EXAMPLES

Ball Drop Testing

Both symmetric and asymmetric laminated glass structure samples were formed according to the apparatuses and methods above. Each laminated glass structure sample had glass measuring 100 mm by 100 mm, a metal substrate measuring 101.6 mm by 101.6 mm, and an adhesive layer of DuPont PV having a thickness of 250 µm. A flexible glass sheet was laminated to three different substrate materials: stainless steel, aluminum, and copper, with material properties detailed in FIG. 7. The sample laminated glass structures were found to have increased impact resistance capabilities and higher intrinsic strength when compared to other laminated glass structures with thicker glass and/or thicker metal substrates. Samples of laminated glass structures according to the present disclosure were tested in a ball drop test to determine impact resistance and found to have enhanced impact resistance and high intrinsic strength.

Figure 9:
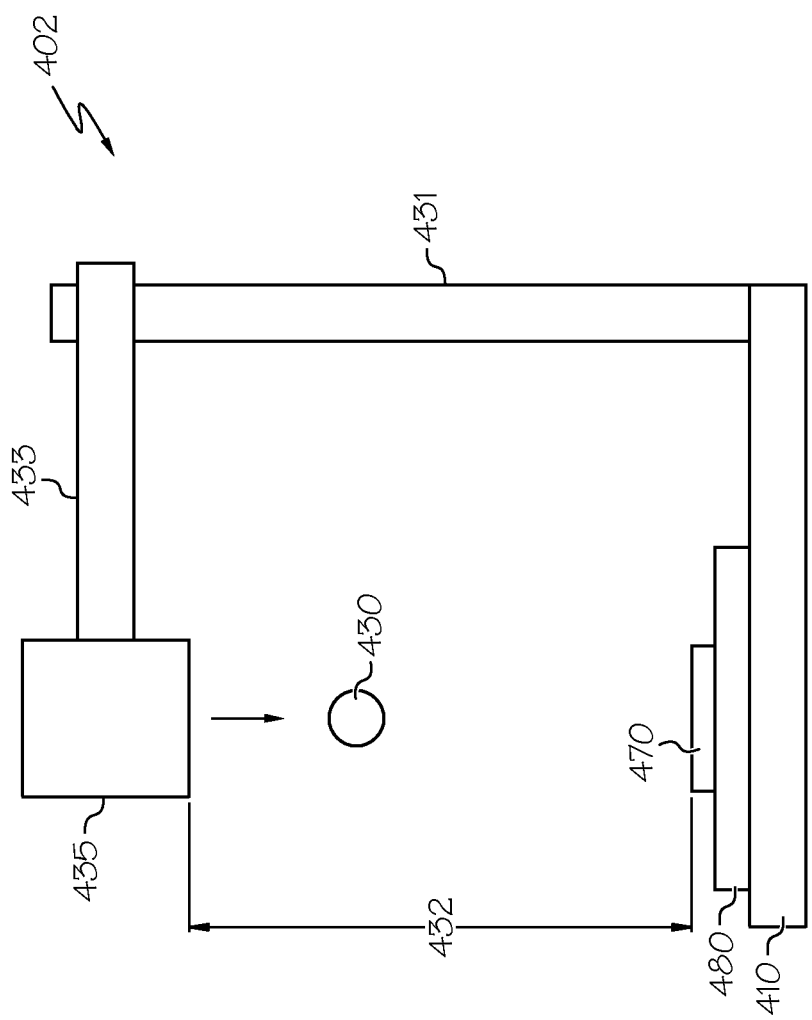
FIG. 9 illustrates a ball drop test apparatus as used for testing samples in accordance with aspects of the disclosure.

Referring now to FIG. 9, a ball drop test apparatus 400 is schematically illustrated. The ball drop test apparatus 400 includes an aluminum testing table 410, a laminated glass structure sample 420, and a 535 gram weight stainless steel ball 430 having a diameter of 51 mm. A height adjustment mechanism 431 was used to adjust a ball drop height 432, starting from 15 cm and increasing in 5 cm increments until failure. A ball release mechanism 435 was positioned on an armature 433 that allowed for magnetic release of the stainless steel ball 430 from a state of rest. A vacuum and/or mechanical release may also be used. The ball 430 had a weight of 535 g and a diameter of 51 mm. A foam block 480 (e.g., Owens Corning Foamular 250 extruded polystyrene (XPS) foam) having a thickness of 25.4 mm was positioned underneath the laminated glass structure 420, supporting the entire area of the laminated glass structure 420. In other embodiments, the foam block 480 may not be used and the laminated glass structure 420 can rest directly on the aluminum testing table 410. The aluminum testing table 410 was rigid and fully supported to ensure minimal energy absorption by the structure, and a height adjustment control device was employed to ensure ball drop height 432 accuracy.

The procedure of the impact test performed in the instant application was as follows: the 535 g weight stainless steel ball 430 was dropped from a ball drop height 432 of 0.15 meters upon an upper surface 422 of the laminated glass structure sample 420 (with the glass facing up). The laminated glass structure sample 420 was positioned horizontally and was not constrained to the aluminum testing table 410. The stainless steel ball 430 was aimed and struck within a ⅝-inch diameter circle located at a geometric center of the laminated glass structure sample 420. The stainless steel ball 430 was not guided or otherwise restricted during freefall or prior to impact. Rather, the stainless steel ball 430 was dropped from a state of rest and from a fixed position at an initial velocity of 0 m/s. The stainless steel ball 430 was released and allowed to fall freely until impacting the glass sheet of the laminated glass structure sample 420.

To determine if the laminated glass structure sample 420 passed the impact test, the upper surface 422 of the laminated glass structure sample 420 had to remain free from fracture. The laminated glass structure sample 420 was considered fractured if a crack propagated through the entire thickness of the glass in the laminated glass structure sample 420, or if any piece of the glass from the laminated glass structure sample 420 visible to the naked eye became detached from any surface of the laminated glass structure sample 420.

If the laminated glass structure sample 420 passed the impact test corresponding to an impact resistance of height 432, the same laminated glass structure sample 420 was repositioned on the aluminum testing table 410, and the stainless steel ball 430 was again dropped, this time with the ball drop height 432 increased to 0.8 m. If the laminated glass structure sample 420 passed the impact test again, the ball drop height 432 was increased to 0.9 m, and increased by about 0.1 m for each subsequent impact test until failure was achieved or a ball drop height 432 of 1.45 m was reached corresponding to an impact resistance of 1.45 m. Ball drop heights 432 included 1 m, 1.295 m, and 1.45 m.

Three combinations of laminated glass structure samples 420 were tested with the ball drop test apparatus 402. Each of the combinations had material properties within the ranges provided in FIG. 7. A first set of laminated glass structure samples 440 had the following combination: flexible glass having a thickness of 100 µm, stainless steel substrate material having a thickness of 1.5875 mm, and 3M OCA8211 adhesive in between, having a thickness of 250 µm. A second set of laminated glass structure samples 450 had the following combination: flexible glass having a thickness of 100 µm, aluminum substrate material having a thickness of 0.8128 mm, and DuPont SentriGlas adhesive in between, having a thickness of 250 µm. A third set of laminated glass structure samples 460 had the following combination: flexible glass having a thickness of 100 µm, stainless steel substrate material having a thickness of 1.5875 mm, and DuPont SentriGlas adhesive in between, having a thickness of 250 µm.

Figure 10:
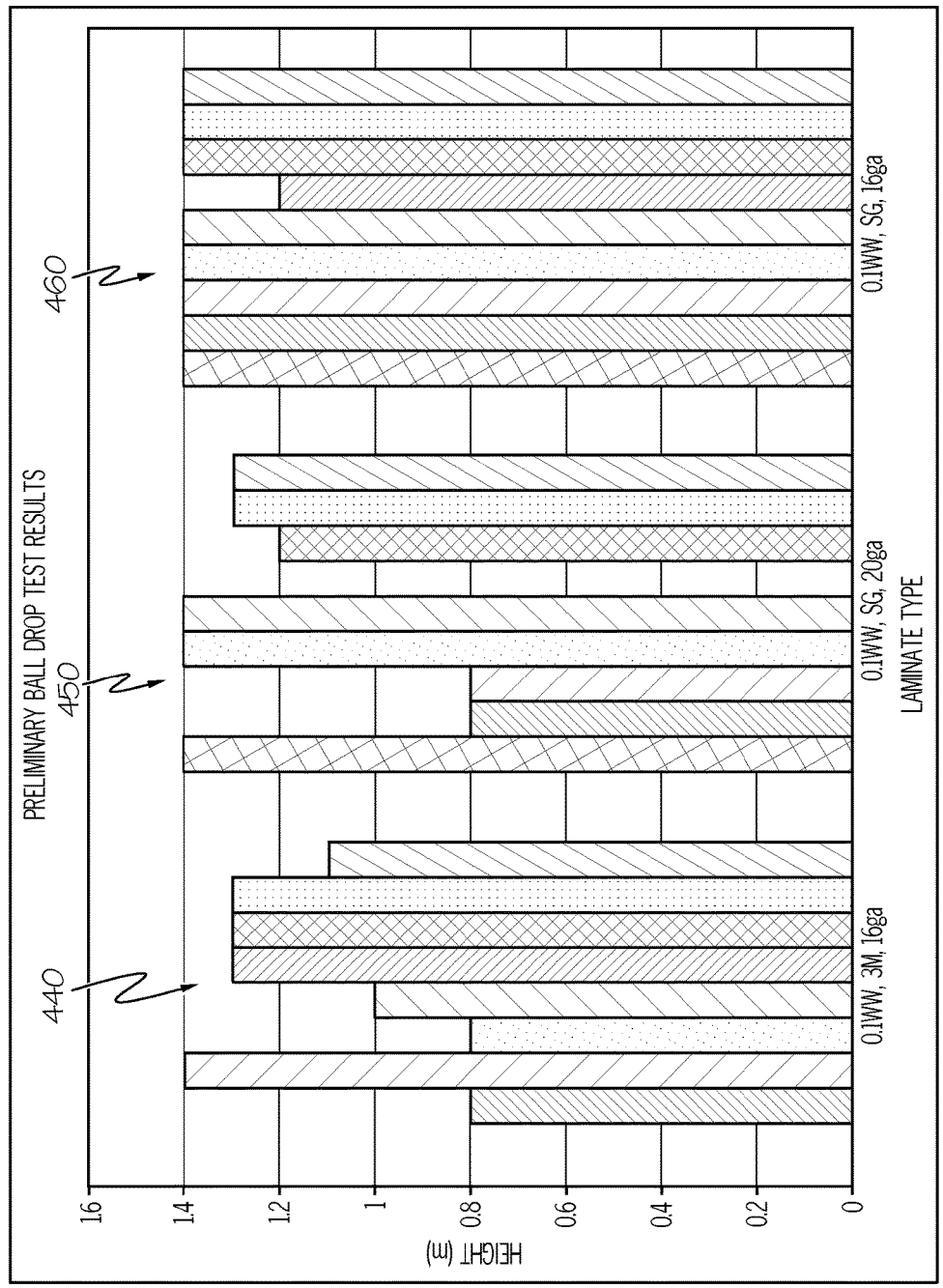
FIG. 10 illustrates the results of the ball drop test performed on laminated glass structures having material properties described in FIG. 7 in accordance with aspects of the disclosure.

The ball drop test results of the three samples 440, 450, 460 are provided in FIG. 10. Each of the samples tested in all of the combinations survived impact from the ball drop test at a height of 0.8 m. Additionally, some samples exhibited an impact resistance of 1.45 m by surviving the ball dropped from a height of 1.45 m. The third combination appeared to have the highest consistent impact resistance measurements.

Figure 11:
FIG. 11 depicts a front view of a sample laminated glass structure tested using the ball drop test apparatus of FIG. 10 in accordance with aspects of the disclosure.

Referring now to FIG. 11, one laminated glass sample 420 is shown that was subjected to the foam ball drop test described in FIG. 9, with a starting ball drop height of 15 cm, increasing in 5 cm increments. The laminated glass sample 420 was tested until a ball drop height of 1.45 m was reached, and the laminated glass sample 420 successfully passed the ball drop test at a ball drop height of 1.45 m. When the stainless steel ball 430 was dropped repeatedly onto the laminated glass structure sample 420 at increasing heights, the laminated glass structure deformed such that a dimple or depression was formed in the non-glass substrate 130 that the flexible glass sheet 140 was laminated to, while the flexible glass sheet 140 remained intact. As shown in FIG. 11, the flexible glass sheet 140 adapted to the shape change, or dimple, of the non-glass substrate 130 without cracking. The particular laminated glass structure sample shown in FIG. 11 included flexible glass having a thickness of 100 µm, stainless steel substrate material having a 16 gauge, or 1.59 mm, thickness, and an adhesive layer of DuPont SentriGlas/PV5411 having a thickness of 250 µm. Because the flexible glass sheet 140 remained intact, as shown in FIG. 11, the laminated glass sample 420 passed the ball drop test for the height 432. Various impact-related standards are described by IEC-60065 and UL-60950.

Compressive Stress Measurements

Figure 12:
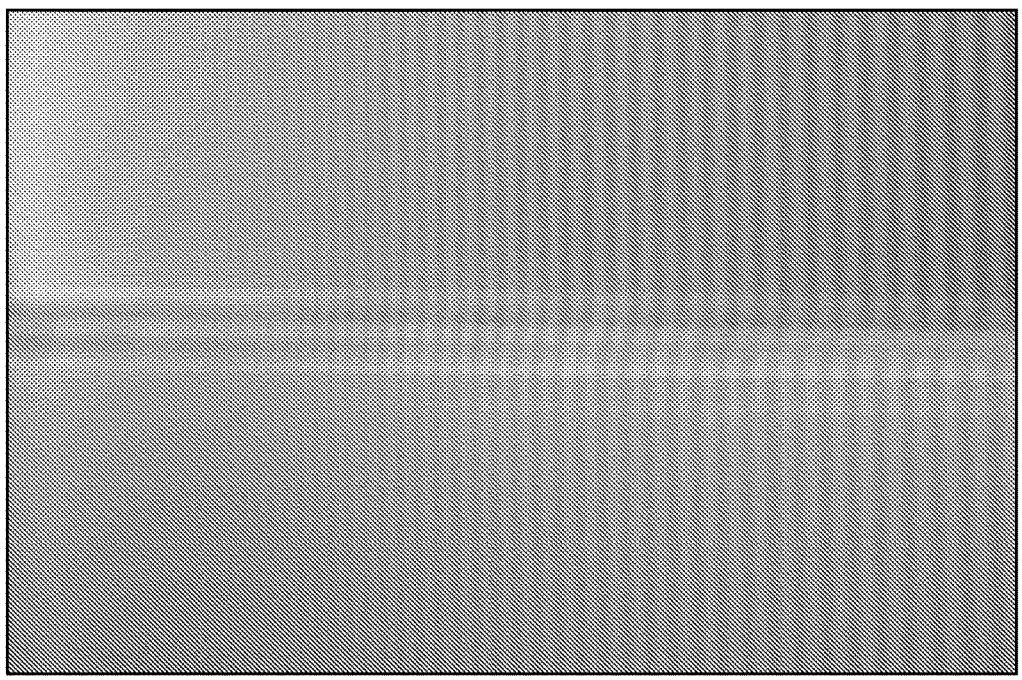
FIG. 12 depicts a compressive stress analysis of a laminated glass structure sample in accordance with aspects of the disclosure.

Direct compressive stresses were measured in one laminated glass structure, where a Norland 68 UV adhesive having a sub-micron thickness was disposed between the glass and the non-glass substrate. The direct compressive stress measurement was made using a FSM-6000 prism-coupler instrument, and the results are shown in FIG. 12. The results indicate birefringence in the laminated glass structure.

A sample laminated glass structure as shown in FIG. 1 was formed using two flexible glass sheets, both 0.1 mm in thickness, and a layer formed of polymethyl methacrylate (PMMA), a transparent thermoplastic, having a thickness of 1.3 mm. A UV, or ultraviolet, sensitive adhesive (NOA 68 commercially available from Norland Products) was applied about 20 nm in thickness between the PMMA layer and the flexible glass layers. The laminated glass structure was placed on a thermoelectric hotplate and heated from one side maintained at 80° C., which was below the UV sensitive adhesive's working limit of 90° C. The UV sensitive adhesive was then cured using UV light applied to the UV sensitive adhesive from a side of the laminated glass structure opposite the thermoelectric hotplate to bond the metal layer at an elevated lamination temperature to the flexible glass layers and allowed to cool at a rate of 3° C./min. About a 110 MPa compressive stress in the flexible glass was confirmed using birefringence measurements (FSM), shown in FIG. 12. Table I below highlights material properties for this exemplary laminated glass structure and Table II below illustrates stress estimates using the compressive stress formula set forth above.

TABLE I

Materials

| Material | Young's modulus (GPa) | Poisson's Ratio | Coefficient of Thermal Expansion ($10^{-6}$/° C.) | Thickness (mm) | Lamination Temp/ Room Temp (° C.) |
|---|---|---|---|---|---|
| PMMA | 2.5 | 0.37 | 90 | 1.3 | 80/20 |
| Glass Substrate | 73.6 | 0.23 | 3.17 | 0.1 (0.2 total) | |

TABLE II

Stress Estimates

| | Compressive Residual Stress in Glass Substrate (MPa) | Tensile Residual Stress in PMMA (MPa) |
|---|---|---|
| Estimate | 105.8 | 16.3 |

While the above examples utilize an intermediate adhesive layer to bond the metal layer and flexible glass, other embodiments may include the metal layer bonded directly to the flexible glass without any use of an intermediate adhesive layer. For example, a metal layer may be heated to a temperature above the plastic softening temperature (glass transition temperature), but below the melting temperature for the metal. For PMMA, for example, the softening temperature is 91° C. to 115° C. and the melting temperature is 160° C. A combination of heat and pressure may be utilized (e.g., using an autoclave) to heat the metal layer to a temperature between the softening temperature and the melting temperature. In some instances, the heated temperature may be held for a preselected period of time and then the laminated glass structure may be cooled at a predetermined rate (e.g., less than about 3° F./min).

General Considerations

In addition to those provided above, further non-limiting examples of adhesive materials 170 for laminating the non-glass substrates 130 to the flexible glass sheets 140 at elevated lamination temperatures include UV curable optical adhesives or optical cements such as those manufactured by Norland™ Optical Adhesives (NOA60, NOA61, NOA63, NOA65, NOA68, NOA68T, NOA71, NOA72, NOA73, NOA74, NOA75, NOA76, NOA78, NOA81, NOA84, NOA88, NOA89), Dow Corning™ (Sylgard 184 and other thermally curing silicones), Dymax™, and others. For heat-activated adhesive materials (e.g., NOA83H), adhesive materials with activation temperatures of greater than a preselected temperature (e.g., about 50° C. or more, such as about 70° C. or more, such as 80° C. or more, such as 100° C. or more) may be used to allow the substrate material an opportunity to expand relative to the flexible glass prior to its lamination thereto.

Additionally, each non-glass substrates may itself be a laminated or composite structure made of different types of metal having different Young's moduli, different Poisson's Ratios, and/or layer thicknesses. In this case, one of skill in the art would be able to homogenize the compound layer to find effective values for the overall layer, including an effective thickness, an effective Young's modulus, and an effective Poisson's Ratio that may be used as described herein to beneficially configure a glass-metal laminate. The composites, for example, may be formed of any combinations of the above materials and/or metals, such as stainless steel, nickel, copper, noble metals, metal oxides, etc.

The laminated glass structures described herein may be a optically clear formable and/or flexible structure for use as a protective element in an electronic device, wherein the laminated glass structure is a composite structure comprising a layer of flexible glass sheet 140 of a thickness from 5 to 300 microns, and a layer of non-glass substrate 130, such as metal, ranging in thickness from 0.1 mm to 5 mm. In this connection, the formability of the laminated glass structure allows it to deviate from full planarity by bending and/or twisting so it can adapt to the shape or form of some other object.

The flexible glass sheet 140 and non-glass substrates 130 can be provided in sheet form according to a batch process. Alternatively, the flexible glass sheet 140 can be provided in sheet form and the non-glass substrate 130 from a continuous roll. As a further possibility, both flexible glass sheet 140 and non-glass substrate 130 are from continuous rolls.

For the non-glass substrate 130, it is possible to use polymers which can be deposited/coated as pre-polymers or pre-compounds and then converted, such as epoxy-resins, polyurethanes, phenol-formaldehyde resins, and melamine-formaldehyde resins. The lamination of the flexible glass 140 and non-glass substrates 130 can be with adhesive material 170 in between the layers. In that case, adhesive material 170 can be pre-coated onto one of the two or on both of the flexible glass sheet 140 and non-glass substrate 130 or otherwise supplied during the lamination process, at room or elevated lamination temperature and with or without pressure. UV-cured adhesives are also suitable. The non-glass substrate 130 can be in the form of metal sheets which are pre-coated with a heat-seal glue. Lamination and/or deposition of the non-glass substrate 130 onto the flexible glass sheet 140 can be integrated in the fabrication process of the glass, i.e. flexible glass comes off the fabrication line and is then (still hot or warm or cold) coated with the metal substrate.

The above-described laminated glass structures provide increased strength to flexible glass. Nearly constant uniform compressive stress can be provided through the glass thickness for symmetric laminate glass structures. The substrate materials can provide breakage protection and hold the flexible glass together in the event of any breakage. The laminated glass structures can provide touch and cover glass, which could be used to replace chemically strengthened glass. Curved display glass, such as that discussed above in connection with asymmetric laminated glass structure can be provided. The flexible glass can also act as a hermetic moisture barrier, block undesired UV light, or inhibit corrosion of the underlying substrate.

Laminated glass structures may also improve optical quality of the substrate material through the flexible glass, performance, strength, impact resistance, scratch resistance to the underlying substrate, and mechanical durability. The substrate material may be protected from scratches, fractures, or other damage by the layer of flexible glass in the laminated glass structure. The flexible glass on an outer surface of the laminated glass structure may be easier to clean than the surface of the substrate material. For example, a refrigerator door made of a laminated glass structure with stainless steel laminated to flexible glass may be fingerprint-resistant, or a mobile electronic device battery cover made of a laminated glass structure with aluminum laminated to flexible glass may be scratch-resistant and easy to clean. Another possible use may be in inhibiting the patina effect in copper materials, for example, roofing or gutter materials, or planter boxes (wherein additionally, the glass surface facing the planting medium would inhibit the undesirable migration of copper into the plants) that are used in an environment containing moisture.

Additional functionality can be incorporated into non-glass substrates 130. For example, the substrate material can comprise a metal polarizer sheet, a contrast-enhancing filter-laminate, have anti-reflective properties, color filter properties or color conversion properties. Alternatively or additionally, the non-glass substrate 130 can be designed to block undesired ambient light and/or have scattering particles so that wave guiding is reduced and the brightness of the device is increased. Still further, alternatively or additionally, the glass can have anti-microbial functionality. Such additional functionalities could be incorporated in the flexible glass 140.

Polymer materials are easily scratched, degrade from environmental elements including sunlight exposure and provide poor moisture/oxygen barrier properties. Glass, on the other hand, is scratch resistant, durable and is known for excellent moisture/oxygen barrier properties. However, glass has higher density compared to, for instance, metal, and is a brittle material where strength of glass is dictated by defects and flaws. The above described laminated glass structures and methods of making them take advantage of these two classes of materials and combining into one laminated structure having improved barrier properties, lightweight and higher mechanical reliability compared to a bare flexible glass stack.

CONCLUSION

It should be emphasized that the above-described embodiments of the present disclosure, including any embodiments, are merely possible examples of implementations, merely set forth for a clear understanding of various principles of the disclosure. Many variations and modifications may be made to the above-described embodiments of the disclosure without departing substantially from the spirit and various principles of the disclosure. All such modifications and variations are intended to be included herein within the scope of this disclosure and the present disclosure and protected by the following claims.

What is claimed is:

1. A laminated glass structure comprising:
   a non-glass substrate having a thickness of from 0.1 mm to 5 mm; and
   a glass sheet bonded to the non-glass substrate while the non-glass substrate is thermally expanded relative to the glass sheet and then controllably cooled to form the laminated glass structure, wherein the laminated glass structure withstands a ball drop test wherein a 535 g stainless steel ball is dropped from a height of 0.8 m onto the laminated glass structure, with the glass sheet being impacted by the ball;
   wherein the glass sheet has a thickness such that the glass sheet exhibits, without cracking, deformation to adapt to any shape change of the non-glass substrate as imparted by the ball of the ball drop test;
   wherein the glass sheet comprises a compressive stress of at least about 30 MPa across a thickness of the glass sheet due to a coefficient of thermal expansion (CTE) mismatch between the non-glass substrate and the glass sheet, the CTE of the non-glass substrate being more than two times a CTE of the glass sheet.

2. The laminated glass structure of claim 1, wherein the glass sheet has a thickness of 300 μm or less.

3. The laminated glass structure of claim 1, wherein the non-glass substrate is composed of a metal or metal alloy.

4. The laminated glass structure of claim 1, wherein the glass sheet has a first CTE that is greater than or equal to about 2 ppm/C and less than or equal to about 5 ppm/C and the non-glass substrate has a second CTE greater than or equal to about 10 ppm/C.

5. A laminated glass structure comprising:
   a glass sheet having a thickness of no more than about 300 μm; and
   a metal substrate having a thickness of no more than 5 mm laminated to a surface of the glass sheet while the metal substrate is thermally expanded relative to the glass sheet and then controllably cooled, so as to achieve a compressive stress of at least about 30 MPa across the thickness of the glass sheet due to a coefficient of thermal expansion (CTE) mismatch between the glass sheet and the metal substrate, the CTE of the metal substrate being more than two times a CTE of the glass sheet.

6. The laminated glass structure of claim 1 or claim 5, further comprising a layer of adhesive positioned between and in contact with the glass sheet and the substrate, the layer of adhesive cured while the non-glass or metal substrate is thermally expanded.

7. The laminated glass structure of claim 6, wherein the layer of adhesive has a thickness of no more than about 1000 μm.

8. The laminated glass structure of claim 1 or claim 5, wherein the substrate has a thickness of no more than about 5 mm.

9. The laminated glass structure of claim 1 or claim 4, wherein the substrate has a Young's Modulus greater than or equal to about 30,000 MPa and less than or equal to about 500,000 MPa.

10. The laminated glass structure of claim 1 or claim 5, comprising at least three layers including a first glass sheet layer, a second glass sheet layer, and the non-glass or metal substrate layer located between the first and second glass sheet layers.

11. The laminated glass structure of claim 1 or claim 5, wherein the non-glass or metal substrate comprises one or more of stainless steel, aluminum, nickel, brass, bronze, titanium, tungsten, copper, cast iron and noble metals.

12. The laminated glass structure of claim 6, wherein no air bubbles within the adhesive layer have a diameter of greater than or equal to 100 microns.

* * * * *

UNITED STATES PATENT AND TRADEMARK OFFICE
CERTIFICATE OF CORRECTION

PATENT NO. : 10,131,118 B2  
APPLICATION NO. : 14/759354  
DATED : November 20, 2018  
INVENTOR(S) : Kiat Chyai Kang et al.

Page 1 of 1

It is certified that error appears in the above-identified patent and that said Letters Patent is hereby corrected as shown below:

On the Title Page

In Column 1, item (71), Applicants, Lines 1-7, delete "Corning Incorporated, Corning, NY (US); Kiat Chyai Kang, Painted Post, NY (US); Sue Camille Lewis, Webster, NY (US); Govindarajan Natarajan, Poughkeepsie, NY (US); Yu Xiao, Pittsford, NY (US); Chunhe Zhang, Horseheads, NY (US)" and insert -- Corning Incorporated, Corning, NY (US) --, therefor.

In Column 1, below "US 2015/0336357" insert -- Related U.S. Application Data Provisional application No. 61/749671, filed on Jan. 07, 2013 --.

In the Claims

In Column 18, Line 34, Claim 3, delete "composed of" and insert -- comprises --, therefor.

In Column 18, Line 62, Claim 8, before "substrate" insert -- non-glass or metal --.

In Column 18, Line 64, Claim 9, delete "claim 4," and insert -- claim 5, --, therefor.

In Column 18, Line 65, Claim 9, before "substrate" insert -- non-glass or metal --.

Signed and Sealed this  
Tenth Day of November, 2020

Andrei Iancu  
*Director of the United States Patent and Trademark Office*